United States Patent [19]

Lane et al.

[11] 4,075,263

[45] Feb. 21, 1978

[54] PROCESS FOR PREVENTING HYDROLYTIC DEGRADATION OF LINEAR SATURATED AROMATIC POLYESTERS COMPRISING A THERMOPLASTIC SATURATED AROMATIC POLYESTER AND A MOISTURE SCAVENGER POLYMER

[75] Inventors: Constance A. Lane, Philadelphia; Joseph C. Koziar, Cornwells Heights, both of Pa.

[73] Assignee: Rohm and Haas Company, Philadelphia, Pa.

[21] Appl. No.: 676,596

[22] Filed: Apr. 13, 1976

[51] Int. Cl.$^2$ .............................................. C08L 67/06
[52] U.S. Cl. ..................................... 260/873; 260/860
[58] Field of Search ................ 260/860, 873, 862, 867

[56] References Cited

U.S. PATENT DOCUMENTS

| | | | |
|---|---|---|---|
| 3,595,937 | 7/1971 | Weissermel et al. | 260/860 |
| 3,954,716 | 5/1976 | Müller et al. | 260/873 X |
| 3,978,155 | 8/1976 | Takiyama et al. | 260/873 X |

FOREIGN PATENT DOCUMENTS 7,308,336  2/1973  Japan.

*Primary Examiner*—Thomas DeBenedictis, Sr.
*Attorney, Agent, or Firm*—Michael B. Fein

[57] ABSTRACT

Compositions comprising linear saturated aromatic polyesters with a minor amount of a moisture scavenger polymer containing cyclic acetal or cyclic ketal units, process for preventing hydrolytic degradation of such polyesters comprising introducing such moisture scavenger polymers, and process of using certain polymers containing cyclic acetal or cyclic units as moisture scavengers for linear saturated aromatic polyesters.

13 Claims, No Drawings

PROCESS FOR PREVENTING HYDROLYTIC DEGRADATION OF LINEAR SATURATED AROMATIC POLYESTERS COMPRISING A THERMOPLASTIC SATURATED AROMATIC POLYESTER AND A MOISTURE SCAVENGER POLYMER

BACKGROUND OF THE INVENTION

1. Field of the Invention

This invention relates to improvements to linear saturated aromatic polyesters.

2. Description of the Prior Art

High molecular weight linear thermoplastic polyesters, especially poly(ethylene terephthalate) and poly(1,4-butylene terephthalate) are well known for film and fiber production. While these polyesters undergo thermal, oxidative and hydrolytic degradation at high temperatures, by far the most serious problem is hydrolytic degradation. Many different types of additives have been described by others in an effort to overcome these problems but none have been wholly successful in overcoming the problem of hydrolytic degradation at high temperatures. Minute traces of moisture in the melt of poly(ethylene terephthalate) and other aromatic polyesters cause chain cleavage by hydrolysis with resultant loss of properties. For fiber production the moisture content must be reduced below 0.005% for satisfactory spinning operations.

It has been fairly well established that improved thermal and hydrolytic stability can be achieved by reduction of the acid content of the polyesters. Some of the types of compounds claimed in the literature as hydrolytic stabilizers for polyesters are carbodiimides, ketenimines, ketenes, and other acid reducing agents.

The major function of these additives appears to be stabilization of the end-product against hydrolytic degradation at temperatures somewhat below the melting point. Rigorous drying is required for all these additives before melt processing the polyester.

Japanese Kokai No. 7308,336 of Feb. 2, 1973 teaches monomeric cyclic acetals for acid content reduction, during melt processing.

U.S. Pat. No. 3,595,937 teaches acetals as impact modifiers for thermoplastic aromatic polyesters.

None of the known hydrolytic stabilizers allow retention of molecular weight after melt processing in the presence of small amounts of moisture.

SUMMARY OF THE INVENTION

It is an object of the present invention to provide improved thermoplastic polyesters.

A further object is to provide thermoplastic aromatic polyesters which need not be absolutely dry before melt processing and yet do not thermally degrade significantly during melt processing.

Another object is to provide a process for preventing hydrolytic degradation of linear saturated aromatic polyesters.

Another object is to use certain polymers as moisture scavengers in moisture sensitive thermoplastic polyesters. These and other objects as will become apparent from the present disclosure are achieved by introducing a minor amount of a moisture scavenger polymer containing cyclic acetal or cyclic ketal units prior to melt processing. Another aspect of the invention is the compositions comprising a linear saturated aromatic polyester and a minor amount of the aforementioned moisture scavenger polymer.

DETAILED DESCRIPTION OF THE INVENTION AND PREFERRED EMBODIMENTS

The linear saturated aromatic polyesters which are improved by the invention are preferably terephthalates or polycarbonates. The hydrolytic stability problem during melt processing is most acute with poly(ethylene terephthalate) and poly(propylene terephthalate), but poly(1,4-butylene terephthalate), polycarbonate, and other moisture sensitive aromatic polyesters are also improved.

The thermoplastic terephthalate polyesters described by Whinfield et al, U.S. Pat. No. 2,465,319, are especially suitable.

The moisture scavenger polymers used in the invention contain cyclic acetal or cyclic ketal units. These units have a structure defined by either

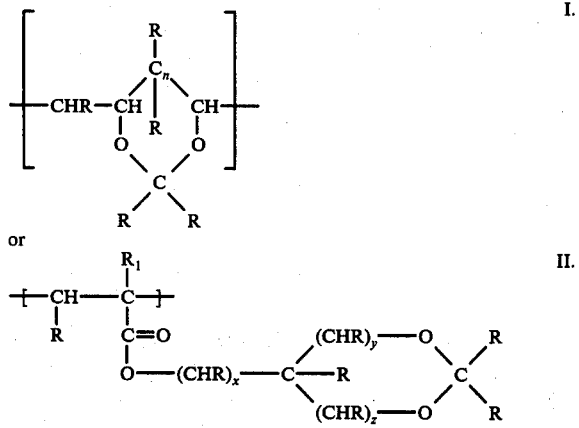

where $R_1$ is hydrogen or methyl;

each R is independently selected from hydrogen or an alkyl group having one to five carbon atoms;

$x$ is an integer from one to nine;

$y$ and $z$ are zero or an integer from one to three but the sum of $y$ plus $z$ must equal one, two or three; and $n$ is 0, 1, or 2.

Generally, the cyclic acetal or ketal units are 5-, 6- or 7- membered ring structures, i.e., 1,3-dioxolanes, 1,3-dioxanes or 1,3-dioxepanes. They can be attached directly to the polymer chain, as in poly(vinyl formal) or poly(vinyl butyral), or they may be on pendant side chains as in poly)isopropylidene glyceryl methacrylate).

Examples of such moisture scavenger polymers are poly(vinyl formal), poly(vinyl butyral), polymers prepared from acrylic or methacrylic acid esters or vinyl or allyl ethers of hydroxyalkyl-1,3-dioxolanes or hydroxyalkyl-1,3-dioxepanes, such as for example poly(isopropylidene glyceryl methacrylate); poly(2-methyl-1,3-dioxolanyl-4-methyl methacrylate); poly(2-butyl-1,3-dioxolanyl-4-methyl methacrylate); poly(2,2-dimethyl-1,3-dioxolanyl-4-ethyl methacrylate); poly(2,2-dimethyl-1,3-dioxolanyl-4 nonyl methacrylate); poly(2-methyl-2-ethyl-1,3-dioxolanyl-4-methyl methacrylate); poly(2,2-dimethyl-5-ethyl-1,3-dioxanyl-5-methyl methacrylate); poly(2-methyl-5-ethyl-1,3-dioxanyl-5-methyl methacrylate); poly(2,2-dimethyl-5-methyl-1,3-dioxanyl-5-methyl methacrylate); poly(cyclohexylidene glyceryl methacrylate); poly(1,3-dioxolanyl 4-methyl methacrylate); and poly(1,3-dioxanyl-5-methyl methacrylate). The intermediate hydroxyalkyl cyclic acetals or ketals are prepared by standard procedures from trihydroxy compounds and aldehydes or ketones. Typical trihydroxy compounds are glycerol, trimethylol propane, 1,2,4-butanetriol, 1,2,6-hexanetriol and 1,2,11-undecanetriol. Typical aldehydes and ketones are acetone, acetaldehyde, formaldehyde, butyraldehyde, acetophenone benzaldehyde and cyclohexanone. Transesterification of the hydroxy alkyl cyclic acetals and ketals with the lower alkyl esters of methacrylic and acrylic acid yields the polymerizable esters. Polymers can be prepared by any procedure that permits retention of the cyclic acetal or ketal group. The cyclic ring system is essential to this invention and acidic conditions must be avoided to prevent premature ring opening. The preferred polymerization procedures are bulk or solution techniques but other methods such as emulsion or suspension may also be used, provided the cyclic ring structure is retained. The molecular weights of the polymers are not critical to this invention but it is preferred that they be above 10,000, preferably the number average molecular weight is in the range of 25,000 to 200,000. Copolymers with other vinyl monomers, such as methyl methacrylate and styrene, can also be utilized but it is preferred that the polymer contains a high percentage of cyclic acetal or ketal groups.

Although these polymers containing cyclic acetal or cyclic ketal units are not novel, their use as moisture scavengers for moisture sensitive materials such as thermoplastic polyester is novel.

It is important that the additive be melt blended into the polyester in a uniform way. The blends can be prepared in a typical resin kettle such as those employed for preparation of the polyesters or in extruders. When the additive is added directly to the resin kettle, the poly(condensation) reaction should be essentially completed before the addition. Large amounts of water will destroy the effectiveness of the additive. The additive is most effective in scavenging the last trace of moisture, preferably below 0.1% from the polyester. For extrusion blending, any standard extruder equipped with a high work screw and a vacuum vent can be employed. The additive, in the form of a powder or salt-like crystals, should be thoroughly mixed with finely ground polyester before extrusion blending. Typically, ¼ inch polyester pellets are granulated to pass through a ⅛ inch screen. Typical extrusion conditions for melt processing the polyesters are satisfactory for blending the additive into the polyester.

The efficiency of the polymeric additive in improving the hydrolytic stability of the polyesters can be measured by intrinsic viscosity determinations and moisture analyses before and after the melt blending operation. The intrinsic viscosity is determined by standard procedures employed for poly(ethylene terephthalate) [i.e., in phenol/tetrachloroethane (60/40) at 30.0° C.]. The moisture content is determined by the Karl Fisher procedure at moisture contents above 0.1%, and by the Meeco Moisture Analyzer, having a standard deviation of 0.001 at 0.02% moisture, at moisture contents below 0.1%.

Correlation of intrinsic viscosity with molecular weight can be calculated using the relationship $[\eta = 1.7 \times 10^{-4} Mn^{0.83}]$ established by Ravens and Ward [Trans. Faraday Soc. 57 150-159, 1961] for poly(ethylene terephthalate). This same relationship can be used to determine the effect of moisture assuming simple hydrolysis of one ester group in the polymer chain per mole of water. The following relationship between intrinsic viscosity, molecular weight and moisture content has been calculated using the equation of Ravens and Ward.

| Theoretical Relationships for poly(ethylene terephthalate) (Assuming $\eta = 1.7 \times 10^{-4} \overline{M}^{0.83}$) | | |
|---|---|---|
| % Water | Intrinsic Viscosity ($\eta$) | $\overline{Mn}$ Number Average MW) |
| 0.0000 | 0.6314 | 20,000 |
| 0.0030 | 0.6144 | 19,355 |
| 0.0050 | 0.6037 | 18,947 |
| 0.0100 | 0.5785 | 18,000 |
| 0.0150 | 0.5556 | 17,143 |
| 0.0300 | 0.4973 | 15,000 |

The following examples are presented to illustrate a few embodiments of the invention.

EXAMPLE 1

Preparation of Isopropylidene Glyceryl Methacrylate

The trade name for 2,2-dimethyl-1,3-dioxolanyl-4-methanol is Solketal, a solvent used for cosmetics and perfumes. Solketal was redistilled prior to use to remove traces of glycerol. To a 3-liter, 3-neck flask, equipped with a stirrer, thermometer and Vigreaux column having a distillation head with a thermoregulator set for a maximum distillation temp. of 40° C., was added 476 grams (3.6 moles) of distilled Solketal, 1082 grams (10.8 moles) of methyl methacrylate and 2.1 grams of the monomethyl ether of hydroquinone (MEHQ). A catalyst solution, prepared from 17.5 grams of a solution of sodium methoxide in methanol (23%) and 7.8 grams of phenol, was then added to the stirred reaction mixture. After reducing the pressure to 200–240 mm Hg, the reaction mixture was heated to reflux and a total of 145 grams of distillate collected over a period of nine hours. A slight air bleed was used throughout the transesterification to help prevent premature polymerization. The reaction mixture was washed with a 10% solution of sodium hydroxide saturated with sodium chloride and the excess methyl methacrylate removed by distillation. After addition of 0.75 grams of MEHQ, distillation gave 466 grams (65% yield) of highly purified isopropylidene glyceryl methacrylate (b.p. 94°–100° C. at 3 mm Hg., $\eta^{25°}$ d 1.4421).

EXAMPLE 2

Typical Solution Polymerization

Toluene (2250 grams) was added to a 5-liter 3-neck flask equipped with a stirrer, thermometer, addition funnel and condenser. The solvent was heated to 85° C. and purged with nitrogen for one hour. The monomer (1500 grams) from Example 1, containing 10 grams of benzoyl peroxide, was added to the hot toluene over a period of 2 hours. The solution was then held at 85° C. for 10 hours. The % solids was 39.3% (Theo. 40%). After evaporation of the solvent, the polymer was a clear, brittle glass that was granulated to the consistency of salt crystals. The intrinsic viscosity in toluene was found to be 0.27. The number average molecular weight by gel permeation chromatography was found to be 43,000 while the weight average molecular weight was in the range of 170,000.

EXAMPLE 3

Typical Bulk Polymerization

To 199 grams of the monomer from Example 1 was added 0.1019 grams of benzoyl peroxide. After degassing, the monomer was sealed in a poly(vinyl alcohol) bag and heated to 74° C. for 24 hours. The polymerization was completed by heating for two hours each at 80° C., 90° C., and 108° C. The resulting clear, glassy polymer was granulated in a Wiley mill to the consistency of salt crystals.

EXAMPLES 4 – 6

Stabilization of Poly(ethylene terephthalate) Containing 0.02% Water

Fiber-grade poly(ethylene terephthalate) (PET, intrinsic viscosity of 0.61, 0.25% $TiO_2$) with moisture contents of 0.020 to 0.25% was extrusion blended with varying amounts of the polymer from Example 2. The ⅛ inch pellets were granulated to pass through a ⅛ inch screen. The blending was accomplished in a one-inch Killion extruder equipped with a high-work-two-stage screw and a vacuum vent. The compression ratios of the screw were 3.15/3.49. A relatively high screw speed (66rpm) to ensure a short dwell time and temperatures of 490°–500° F. were employed. The hopper was blanketed with dry nitrogen and 0.25% of a commercial high temperature antioxidant (Ethyl 330) was added to the blend to protect against oxidation. Moisture contents of the PET prior to blending were determined with a Meeco Moisture Analyzer having a standard deviation of 0.001 at 0.02% water. Intrinsic viscosity measurements were run in phenol/tetrachloroethane (60/40) at 30.0° C. on the extrusion blended samples. The acid content was determined by the method of Pohl (Anal. Chem. Vol. 26, p. 1614, 1954). These results are summarized in Table 1.

TABLE I

| | % Water[a] in PET | Wt. % of Polymer from Ex. 2 | Meg. COOH/kg[b] | Intrinsic Viscosity of Extrudate[c] |
|---|---|---|---|---|
| Ex. 4 | 0.020 | None | — | 0.54 |
| | 0.020 | 0.23 | — | 0.56 |
| | 0.020 | 0.47 | — | 0.58 |
| | 0.020 | 0.60 | — | 0.61 |
| | 0.020 | 0.80 | — | 0.59 |
| | 0.020 | 1.00 | — | 0.58 |
| | 0.020 | 1.20 | — | 0.59 |
| Ex. 5 | 0.022 | None | — | 0.49 |
| | 0.022 | 1.67 | — | 0.60,0.61 |
| Ex. 6 | 0.025 | None | 38 | 0.54 |
| | 0.025 | 0.5% | — | 0.58 |
| | 0.025 | 1.0% | 38 | 0.58,0.64 |
| | 0.025 | 2.0% | 38 | 0.57,0.60 |

[a] Determined by Meeco Moisture Analyzer before blending.
[b] Procedure of Pohl; Anal. Chem. 26, 1614, (1954).
[c] In phenol/tetrachloroethane (60–40) at 30° C. after extrusion blending at 490° F.; original I.V. = 0.61.

EXAMPLES 7 – 10

Stabilization of PET Containing 0.031–0.044% Water

Procedures similar to Examples 4–6 were employed to blend the polymer from Example 2 into PET containing 0.031–0.044% water. The PET was granulated to pass through a ⅛ inch screen.

The results are indicated in Table II.

TABLE II

| | % Water[a] in PET | Wt. % of Polymer from Ex. 2 | Intrinsic Viscosity of Extrudate[b] |
|---|---|---|---|
| Ex. 7 | 0.031 | None | 0.53 |
| | 0.031 | 1.0 | 0.56 |
| | 0.031 | 1.5 | 0.62,0.60 |
| | 0.031 | 2.5 | 0.57 |
| Ex. 8 | 0.032 | None | 0.54 |
| | 0.032 | 1.2% | 0.59 |
| | 0.032 | 2.4% | 0.59 |
| Ex. 9 | 0.040 | None | 0.44 |
| | 0.040 | 1.0% | 0.57,0.58 |
| | 0.040 | 3.0% | 0.56,0.57 |
| | 0.040 | 4.0% | 0.56,0.57 |
| Ex. 10 | 0.044 | None | 0.45 |
| | 0.044 | 0.6% | 0.58 |
| | 0.044 | 1.0% | 0.57 |

[a] Determined by Meeco Moisture Analyzer before blending.
[b] In phenol/tetrachloroethane (60/40) at 30.0° C. after extrusion blending at 490° F. original I.V. = 0.61.

EXAMPLES 11 – 15

Stabilization of PET Containing 0.05 to 0.13% Moisture

Blends similar to Examples 4–6 were prepared with PET containing 0.05–0.13% water. Above 0.08% moisture, the effect of the stabilizer was not as dramatic as at lower moisture contents. However, increased amounts of the stabilizer may be desirable since it appears that the optimum amount of stabilizer is in the range of 3 to 6 times that required for reaction with the water. These results are summarized in Table III.

TABLE III

| | % Water[a] in PET | Wt. % of Polymer from Ex. 2 | Intrinsic Viscosity of Extrudate[b] |
|---|---|---|---|
| Ex. 11 | 0.052 | None | 0.54,0.50 |
| | 0.052 | 0.6 | 0.59 |
| | 0.052 | 1.0 | 0.58 |
| Ex. 12 | 0.060 | None | 0.50 |
| | 0.060 | 0.8 | 0.59 |
| | 0.060 | 1.2 | 0.59 |
| | 0.060 | 1.4 | 0.59 |
| Ex. 13 | 0.082 | None | 0.48 |
| | 0.082 | 2.0 | 0.54 |
| Ex. 14 | 0.115 | None | 0.45 |
| | 0.115 | 1.9 | 0.50 |
| Ex. 15 | 0.13 | None | 0.46 |
| | 0.13 | 1.5 | 0.50 |
| | 0.13 | 1.8 | 0.52 |
| | 0.13 | 2.0 | 0.54 |

[a] Determined by Meeco Moisture Analyzer before blending.
[b] In phenol/tetrachloroethane at 30.0° C. after extrusion blending at 490° F., original I.V. = 0.61.

EXAMPLE 16

(a) 2,2-Dimethyl-5-ethyl-1,3-dioxanyl-5-methanol was prepared by condensation of trimethylol propane with acetone. The methacrylate ester was prepared by transesterification with methyl methacrylate by a procedure similar to Example 1. The polymer was prepared by solution polymerization as described in Example 2.

(b) 2-methyl-5-ethyl-1,3-dioxanyl-5-methanol was prepared from acetaldehyde and trimethylol-propane. Transesterification with methyl methacrylate by a procedure similar to Example 1 gave the methacrylate ester which was polymerized by a procedure similar to Example 2.

EXAMPLES 17 – 18

A commercial grade of poly(vinyl butyral) and the polymers from 16(a) and 16(b) were extrusion blended into wet PET at 490° F. The procedure was similar to that for Examples 4–6. These results are summarized in Table IV.

TABLE IV

| | Moisture Content of PET[a] | Wt. % of Additive | Intrinsic Viscosity[b] |
|---|---|---|---|
| Ex. 17 | 0.022 | None | 0.53 |
| | 0.022 | 1.7% Ex. 2 | 0.60, 0.61 |
| | 0.022 | 1.7% Ex. 16(a) | 0.58 |
| Ex. 18 | 0.115 | None | 0.45 |
| | 0.115 | 1.9% Ex. 2 | 0.50 |
| | 0.115 | 1.5% poly(vinyl butyral) | 0.49 |
| | 0.115 | 2.0% poly(vinyl butyral) | 0.51 |
| | 0.115 | 1.9% Ex. 16(a) | 0.48 |
| | 0.115 | 2.2% Ex. 16(b) | 0.47 |

[a]Before blending.
[b]After extrusion at 490° F., original I.V. = 0.61.

Blends of minor amounts of the polymers containing the cyclic acetal or ketal groups with poly(ethylene terephthalate) revealed no adverse effect on the physical properties, such as impact strength, tensile strength, hardness and heat distortion temperature, of injection molded parts.

EXAMPLE 19

In a manner similar to Examples 4–6, 1.0–1.5% by weight of the polymer produced in Example 2 was extrusion blended into poly(1,4-butylene terephthalate) containing 0.06% water with little or no reduction in the intrinsic viscosity.

COMPARATIVE EXAMPLES

For comparative purposes the effect of various monomeric acetals and ketals on poly(ethylene terephthalate) was determined. Simple open chain monomeric acetals and ketals promoted extensive molecular weight degradation. The low molecular weight cyclic acetals and ketals cited in Japan Kokai 73-08336 exhibited little or no stabilizing effect as measured by intrinsic viscosity measurements. These results are summarized in Table V.

TABLE V

| | % Moisture in PET[a] | Wt. % Additive[b] | Intrinsic Viscosity[c] |
|---|---|---|---|
| Ex. 20 | 0.020 "semi-dry" | None | 0.49, −0.51 ± 0.01 |
| | 0.020 | 0.2% 1,3-dioxolane | 0.52 ± .01 |
| | 0.020 | 1.0% 1,3-dioxolane[d] | 0.52 ± .01 |
| | 0.020 | 1.5% 1,3-dioxolane | 0.53 ± .01 |
| | 0.020 | 0.25% 1,3-dioxepane | 0.50 ± .01 |
| | 0.020 | 0.5% Ex. 2 | 0.55 ± .01 |
| | 0.020 | 1.5% Ex. 2[d] | 0.60 ± .01 |
| | 0.020 | 0.6% Ex. 16(a) | 0.54 ± .01 |
| | 0.020 | 1.8% Ex. 16(a)[d] | 0.58 ± .01 |
| Ex. 21 | 0.082 | None | 0.48 ± .01 |
| | 0.082 | 1% 1,3-dioxepane | 0.48 ± .01 |
| | 0.082 | 0.7% 1,3-dioxolane | 0.50 ± .01 |
| | 0.082 | 2% Ex. 2 | 0.54 ± .01 |
| Ex. 22 | 0.115 | None | 0.45 ± .01 |
| | 0.115 | 3% Ex. 2 | 0.52 ± .01 |
| | 0.115 | 2.6% Solketal | 0.20 ± .01 |
| | 0.115 | 2% acetal | 0.33 ± .01 |
| | 0.115 | 2% acetone dimethyl acetal | 0.44 ± .01 |
| | 0.115 | 3.3% diethyl phenyl ortho formate | 0.32 ± .01 |
| | 0.115 | 5% polycarbodiimide[e] | 0.35 ± .01 |

[a]Before extrusion blending.
[b]100% excess over theo. amount required for reaction with water.
[c]In phenol/tetrachloroethane at 30° C., after extrusion blending at 490° C., original I.V. = 0.61.
[d]500% excess of theory for reaction with water.
[e]Stabaxol P from Naftone, New York, New York.

Having described the invention in considerable detail, it should become apparent that certain variations and modifications can be made without departing from the spirit and scope of the invention.

We claim:

1. Composition comprising a linear thermoplastic saturated aromatic polyester, and a minor amount of a moisture scavenger polymer containing cyclic acetal or cyclic ketal units, said units having a structure defined by either

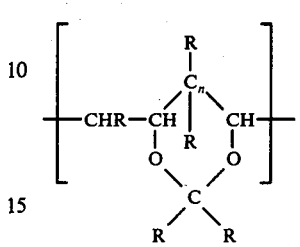

I.

or

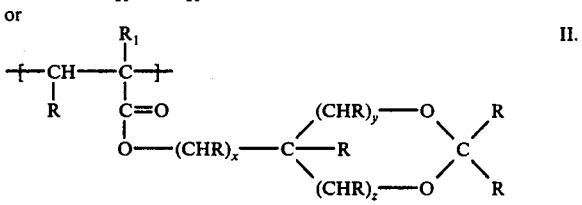

II.

where
$R_1$ is hydrogen or methyl;
each R is independently selected from hydrogen or an alkyl group having one to five carbon atoms;
$x$ is an integer from one to nine;
$y$ and $z$ are zero or an integer from one to three but the sum of $y$ plus $z$ must equal one, two or three; and
$n$ is 0, 1, or 2.

2. The composition of claim 1 wherein said units have the structure

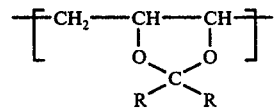

3. The composition of claim 1 wherein said moisture scavenger is selected from poly(vinyl formal) or poly(vinyl butyral).

4. The composition of claim 1 wherein said moisture scavenger is 60–100% of poly(isopropylidene glyceryl methacrylate) and 0 to 40% of a non-acidic copolymerizable vinyl monomer.

5. The composition of claim 1 wherein said moisture scavenger polymer is poly(isopropylidene glyceryl methacrylate).

6. The composition of claim 1 wherein the moisture scavenger is polymerized from 60–100% of 2,2-dimethyl-5-ethyl-1,3-dioxanyl-5-methyl methacrylate and 0–40% of a non-acidic copolymerizable vinyl monomer.

7. The composition of claim 1 wherein the moisture scavenger polymer is polymerized from 60–100% of 2-methyl-5-ethyl-1,3-dioxanyl-5-methyl methacrylate and 0–40% of a non-acidic copolymerizable vinyl monomer.

8. The composition of claim 1 wherein the linear saturated polyester is selected from poly(ethylene terephthalate) and poly(1,4-butylene terephthalate).

9. The composition of claim 1 wherein the linear saturated polyester is poly(ethylene terephthalate) and the moisture scavenger polymer is poly(isopropylidene glyceryl methacrylate), and the weight ratio of polyester to moisture scavenger polymer is about 99.9:0.1 to 90:10.

10. The composition of claim 1 wherein the weight ratio of polyester to moisture scavenger polymer is about 99.9:0.1 to 90:10.

11. The composition of claim 1 wherein the weight ratio of polyester to moisture scavenger polymer is about 99.8:0.2 to 96:4.

12. A process for preventing hydrolytic degradation of linear saturated aromatic polyesters comprising introducing a minor amount of a moisture scavenger polymer containing cyclic acetal or cyclic ketal units prior to melt processing.

13. The process of claim 11 wherein said moisture scavenger polymer is introduced in a weight ratio of polyester to moisture scavenger polymer of about 99.9:0.1 to 90:10.

* * * * *